United States Patent [19]

Ishigaki

[11] Patent Number: 5,072,592
[45] Date of Patent: Dec. 17, 1991

[54] GAS CLEANER

[75] Inventor: Tsuneo Ishigaki, Soka, Japan

[73] Assignee: SMC Corporation, Tokyo, Japan

[21] Appl. No.: 543,479

[22] Filed: Jun. 26, 1990

[51] Int. Cl.[5] .............................................. B01D 8/00
[52] U.S. Cl. ........................................ 62/55.5; 55/82; 55/269
[58] Field of Search ...................... 55/82, 269; 62/55.5

[56] References Cited

U.S. PATENT DOCUMENTS

| 3,366,107 | 1/1968 | Frantom | 55/269 |
| 3,464,223 | 9/1969 | Roberts et al. | 62/55.5 |
| 3,483,980 | 12/1969 | Cochran et al. | 55/269 |
| 3,808,775 | 5/1974 | Heller et al. | 55/269 |
| 4,538,423 | 9/1985 | Le Diouron | 55/269 |
| 4,755,201 | 7/1988 | Eschwey et al. | 55/269 |
| 4,816,046 | 3/1989 | Maeba et al. | 55/269 |
| 4,832,715 | 5/1989 | Naruse | 55/269 |

Primary Examiner—Ronald C. Capossela
Attorney, Agent, or Firm—Oblon, Spivak, McClelland, Maier & Neustadt

[57] ABSTRACT

A gas cleaner dehumidifies a chamber or other container, into which air or other gases are supplied, in order to realize the minimizing of the moisture held therein, which is an indispensable requisite to quick evacuation. A hermetically sealed container of a thermally conductive material is immersed in a coolant filled in a coolant container. Filters of a thermally conductive sintered metal disposed in the hermetically sealed container cools and liquefies the gas admitted through a supply pipe and thereby removes the unwanted moisture.

10 Claims, 2 Drawing Sheets

GAS CLEANER

FIELD OF THE INVENTION

This invention relates to gas cleaners to remove moisture, dust and other foreign matters from gases, and more particularly to gas cleaners suited for removing moisture, dust and other foreign matters from various kinds of gases to be introduced into chambers to produce extra- or super-high vacuum or various kinds of process gases.

DESCRIPTION OF THE PRIOR ART

When lowering the vacuum pressure in a container, gas molecules carried at the surface of or occluded in the container are liberated into the space therein when the pressure has dropped to $10^{-4}$ to $10^{-5}$ torr, thereby inhibiting the further drop of the pressure. Baking is an artificial measure to quickly release such unwanted gases by heating the container.

The description speed of many gases, such as $H_2$, $O_2$ and $CH_4$, at ordinary temperature (20° C.) is between $10^{-12}$ and $10^{-13}$ sec. That of $H_2O$ is of the order of $10^{-6}$ sec. At 150° C., the desorption speed of $H_2O$ decreases to the order of $10^{-8}$ sec., whereas that of other gases, such as $H_2$, $O_2$ and $CH_4$, remains substantially the same. Therefore, baking is effective for quickly liberating $H_2O$ from the surface of the container, but the effect of baking is not so significant as the case of $H_2O$ for other gases.

To quickly lower the vacuum pressure in a chamber or other space, therefore, it is necessary to minimize the moisture content therein. It should be noted that at ordinary temperature the chamber wall carries an approximately $10^6$ times greater amount of $H_2O$ than $H_2$, $O_2$, $CH_4$ and other gases. Therefore it takes about $10^6$ times longer time for $H_2O$ to reach from the chamber wall to a discharge pump. This clearly shows how it is important to reduce the moisture content to a minimum. Accordingly, supplying gases of low moisture content to vacuum containers is effective for their quick evacuation. For example, gases (such as air) supplied to evacuated chambers whose pressure level should be either left as evacuated or returned to atmospheric must be dehumidified.

In an experiment the inventors conducted, it took about 800 minutes to evacuate a chamber to $10^{-8}$ torr after filling it with air of 45 percent humidity. The time was reduced to about 120 minutes when the chamber was filled with a gas containing 10 to 20 ppm of moisutre, and further to about 11 minutes with a dehumidified gas (to below the 1 ppm limit measurable with a commercially available measuring instrument).

Elimination of $H_2O$ is also essential in the production of semiconductors in a vacuum because $H_2O$ decomposes into $H_2$ and $O_2$, with the result that $O_2$ combines with silicon wafers to form $SiO_2$ that impairs the high purity required of the products. But it is usually very difficult to avoid the mixing of $H_2O$ during the transportation of gases from their makers to the point of their use. Therefore it becomes indispensable to always keep $H_2O$ out of the chambers where extra- or super-high vacuum is produced or some specific type of work, such as the production of semiconductors, is carried out.

Porous adsorbents, known as the molecular sieve, filled in sorption pumps and cooled with liquid nitrogen or other coolants have conventionally been used for the adsorption and removal of moisture, dust, impurities and unwanted gases to avoid the entering of moisture, dust and other foreign substances into the chambers in which extra- or super-high vacuum is produced, or surface analysis (particularly one done in a vacuum) or production of semiconductors is carried out. The molecular sieve is made of an artificially prepared highly adsorptive zeolite which adsorbs more gases when cooled to lower temperature and releases the adsorbed gases when heated.

But the removal of moisture with molecular sieves involves the following problem. Molecular sieves hardly adsorb the molecules of gases whose diameter is larger than that of their own pores. In other words, the gases adsorbed by molecular sieves are mostly limited to those whose molecule's diameter is smaller than the diameter of their own pores. Therefore, molecular sieves adsorbs even necessary gases if their molecules are smaller than their pores. As such, their use is limited to certain applications. Because of their poor heat conductivity, in addition, their temperature, when cooled with liquid nitrogen, does not fall below more than 100° C. above the temperature of liquid nitrogen ($-195.8°$ C.) in two hours. This means that the intended work cannot be started promptly. As such, molecular sieves, though they are known to be useful in various applications, are not effective in the removal of moisture described above.

SUMMARY OF THE INVENTION

An object of this invention is to provide a gas cleaner that is capable of efficiently removing unwanted moisture and dust without adsorbing the necessary gases.

Another object of this invention is to provide a gas cleaner having a filter of a sintered metal of good enough heat conductivity to get readily cooled at the start of operation to bring the cleaner into a working condition in a short time so that the intended work can be started promptly.

Still another object of this invention is to provide a gas cleaner having a filter of a sintered metal of good enough heat conductivity to permit an efficient temperature drop that results in the enhancement of the adsorption efficiency.

Yet another object of this invention is to provide a gas cleaner that permits easy temperature control of the coolant.

A further object of this invention is to provide a gas cleaner having a filter encased in a hermetically sealed container, with part of the container placed in a case whose temperature can be readily controlled so that the liquefaction of gases in the hermetically sealed container can be prevented by application of heating as required.

In order to achieve the above objects, the gas cleaners according to this invention comprise a heat-insulating coolant container to hold a coolant, a hermetically sealed container of a thermally conductive material to be immersed in the coolant held in the coolant container, the hermetically sealed container having a pipe to supply a gas to be cleaned, a pipe to discharge a cleaned gas and a multi-stage filter of a sintered metal to remove moisture by cooling and adsorbing the gas flowing from the supply pipe to the discharge pipe therein and the multi-stage filter being made of a sintered metal prepared by sintering fine particles or fibers of a thermally conductive metal and directly fitted to the inner wall of the hermetically sealed container.

When the liquefying temperature of the gas to be cleaned is identical or analogous to the temperature of the coolant, the gas to be cleaned may liquefy in the hermetically sealed container without flowing to the discharge pipe. In such cases, therefore, a heat-insulating coolant container to hold a coolant, a case to pass a temperature control fluid and a hermetically sealed container of a thermally conductive material extending over both of the coolant container and case are provided. While the gas inlet side of the hermetically sealed container is placed in the case, the gas outlet side is encased in the coolant container. While the filter on the gas inlet side is positioned in that portion of the hermetically sealed container which is placed in said case, the other filters are placed in the portion thereof in the coolant container.

The gas cleaners of this invention may also comprise a pipe to supply a primary coolant, a heat-insulating coolant container to be filled with a secondary coolant that is cooled by the primary coolant to a temperature near the freezing point thereof, and a thermally conductive hermetically sealed container immersed in the coolant in the coolant container. The hermetically sealed container has a pipe to supply a gas to be cleaned, a pipe to discharge the cleaned gas and a multi-stage filter of a sintered metal to remove moisture by cooling and adsorbing the gas flowing from the supply pipe to the discharge pipe therein and the multi-stage filter being made of a sintered metal prepared by sintering fine particles or fibers of a thermally conductive metal and directly fitted to the inner wall of the hermetically sealed container.

DESCRIPTION OF THE PREFERRED EMBODIMENTS

Figure 1:
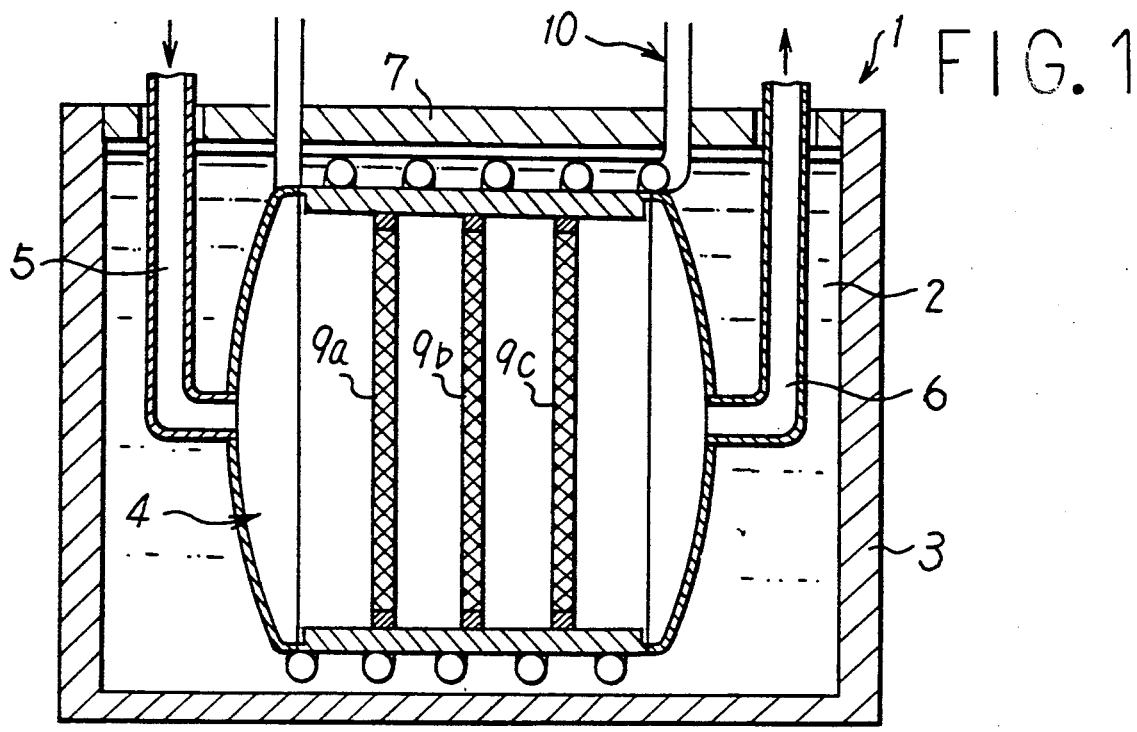
FIG. 1 is a cross-sectional front view of a first preferred embodiment of this invention.

FIG. 1 shows a first preferred embodiment of this invention. A gas cleaner 1 comprises a heat-insulating coolant container 3 to be filled with a coolant 2, such as liquid nitrogen and Freon, and a hermetically sealed container 4 immersed in the coolant 2. A supply pipe 5 and a discharge pipe 6 to send a gas to be cleaned into and a cleaned gas out of the hermetically sealed container 4 extend outside the gas cleaner 1 through the holes provided in a heat-insulating cover 7 of the coolant container 3.

The hermetically sealed container 4 is made of a thermally conductive material, such as stainless steel and aluminum alloys. Filters 9a, 9b and 9c are disposed in the direction substantially perpendicular to the direction of the gas flow. The filters are joined together so that a good thermal conductivity is maintained by fastening them closely to the inner walls of the container 4. The filters are made by sintering fine particles, fibers or composites thereof of a thermally conductive metal, such as stainless steel and brass. The filters are formed to have such meshes as are close to the mean free path of the gas to be cleaned. For ease of manufacturing, the particles or fibers may be put together with pores of the order of a few $\mu$m left therebetween to allow the passage of the fluid. But it is desirable to reduce the size of the pores to below 1 $\mu$m (preferably to about 0.1 $\mu$m). It is also preferable to make the pores in the successive filters progressively finer from the coarser one 9a on the inlet side toward the finer one 9c on the outlet side. It is particularly preferable for the filter on the inlet side, which adsorbs a large quantity of moisture, to have coarser pores.

The hermetically sealed container 4 contains a heater 10 that heats the atmosphere under a high vacuum by passing a heating fluid before the cleaning of the gas starts, thereby sufficiently releasing the moisture within the container.

When a coolant 2, such as liquid nitrogen, is filled in the coolant container 3, the temperature in the hermetically sealed container drops rapidly from the periphery thereof toward the center of the filters 9a, 9b and 9c. Made of a material having a good thermal conductivity, the filters 9a, 9b and 9c cool faster than the aforementioned molecular sieve, thus permitting gas cleaning to be started in a shorter time.

When the filters 9a, 9b and 9c have been fully cooled, a gas to be cooled is supplied through the supply pipe 5. The gas flows through the filters 9a, 9b and 9c to the discharge pipe 6, whereby the coolant 2 liquefies and adsorbs gases (vapors) of impurities that evaporate at higher temperatures than the coolant 2. After the impurity gases, moisture and dust have been removed by the filters 9a, 9b and 9c, a cleaned gas flows outside through the discharge pipe 6. The lower the temperature, the greater the amount of molecules adsorbed. Therefore, the high thermal conductivity of the filters 9a, 9b and 9c helps enhance the efficiency of adsorption. The gas to be cleaned passes through the pores of the filters 9a, 9b and 9c that are as fine as only a few microns several hundred times. Therefore, the filters catch more gas molecules because their probability of colliding the inner wall of the filters is high. Being not so porous as the molecular sieve, the filters permit increasing the flow rate of the gas, without adsorbing necessary components.

The filters made of stainless steel can be used for the dehumidification and dust removal of corrosive gases.

The gas cleaner just described is of the type in which the removed impurities and dusts are accumulated. When continuous gas cleaning is desired, therefore, two or more units of the same gas cleaner must be prepared. Then, while one is at work, the hermatically sealed container 4 of another unit is heated by the heater 10, with its inside dehumidified and cleaned by means of a vacuum pump. The high thermal conductivity of the filters 9a, 9b and 9c again permits quick heating and fast dehumidification of the hermetically sealed container 4.

The first preferred embodiment just described is of an overall cooling type that cools the entirety of the hermetically sealed container 4. When the liquefaction temperature of the coolant 2 and the gas to be cooled is the same or analogous, as in cleaning nitrogen gas with liquid nitrogen, the gas (e.g., nitrogen gas) may not flow to the discharge pipe 6, liquefying within the hermetically sealed container 4. When the coolant 2 in the coolant container 3 runs out, the liquefied gas in the hermetically sealed container 4 may vaporize to push up the pressure therein to an extremely high level.

Figure 2:
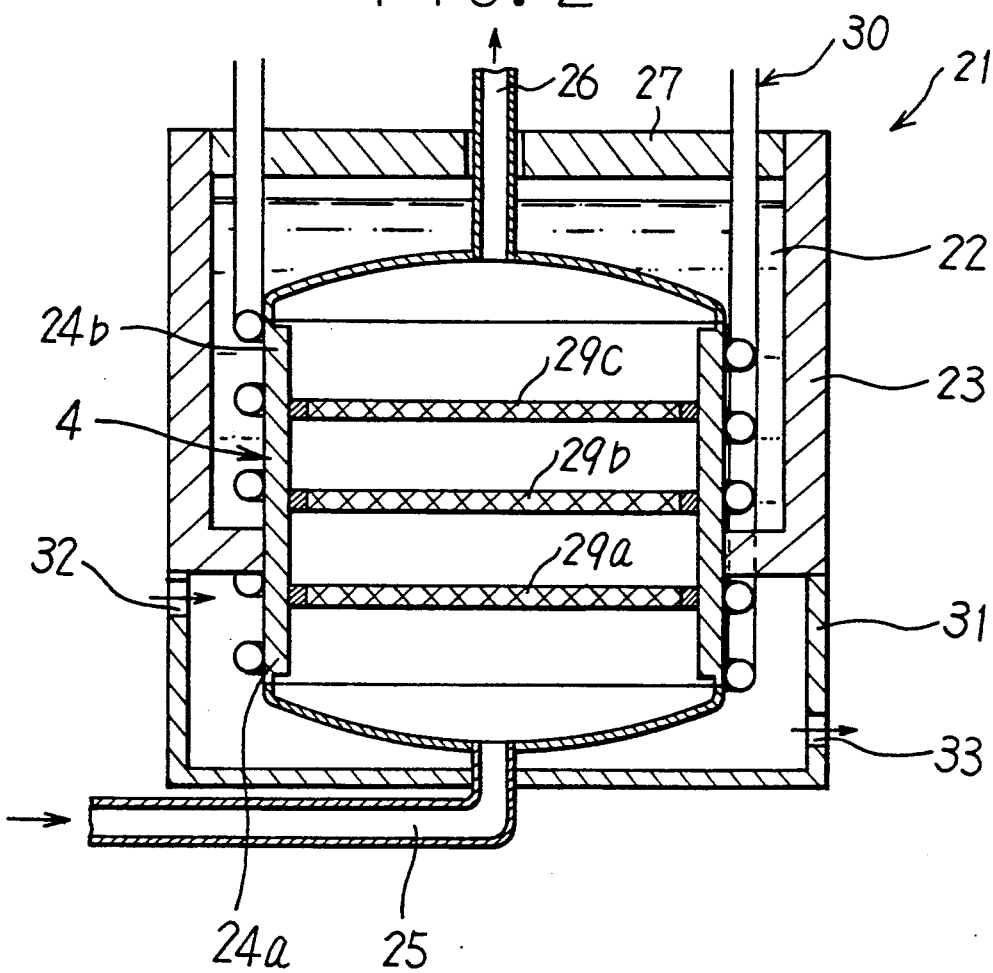
FIG. 2 is a cross-sectional front view of a second preferred embodiment of this invention.

FIG. 2 shows a second preferred embodiment of this invention whose hermetically sealed container is partially cooled to overcome the above problem.

A gas cleaner 21 comprises a heat-insulating coolant container 23 to be filled with a coolant 22, a heat-insulating case 31 placed below the coolant container 23, and a hermetically sealed container 24 in which gas is cleaned. The gas inlet side 24a of the container 24 is placed in the case 31 and the gas outlet side 24b in the coolant container 23. A filter 29a on the gas supply side is positioned in the case 31 that has an inlet 32 to admit air or other gases and an outlet 33. Filters 29b and 29c are positioned in the coolant container 23. A pipe 25 to supply a gas to be cleaned and a pipe 26 to discharge a cleaned gas extend outside the cleaner 21 through the holes 27 provided in the case 31 and a heat-insulating cover 27 of the coolant container 23.

The gas cleaner 21 has a temperature control unit that heats the gas inlet side 24a of the hermetically sealed container 24 by forcibly passing air or other gases from the inlet 32 to the outlet 33. Thus, the liquefaction of gases within the hermetically sealed container 24 can be prevented by actuating the temperature control unit as required.

Even when the gas to be cleaned has liquefied at the filters 29b and 29c, the resulting liquid drops onto the filter 29a and vaporizes. Therefore, the gas within the hermetically sealed container 24 always remains unliquefied.

Reference numeral 30 designates a heater whose construction and function are as described previously with reference to the first preferred embodiment of this invention.

Figure 3:
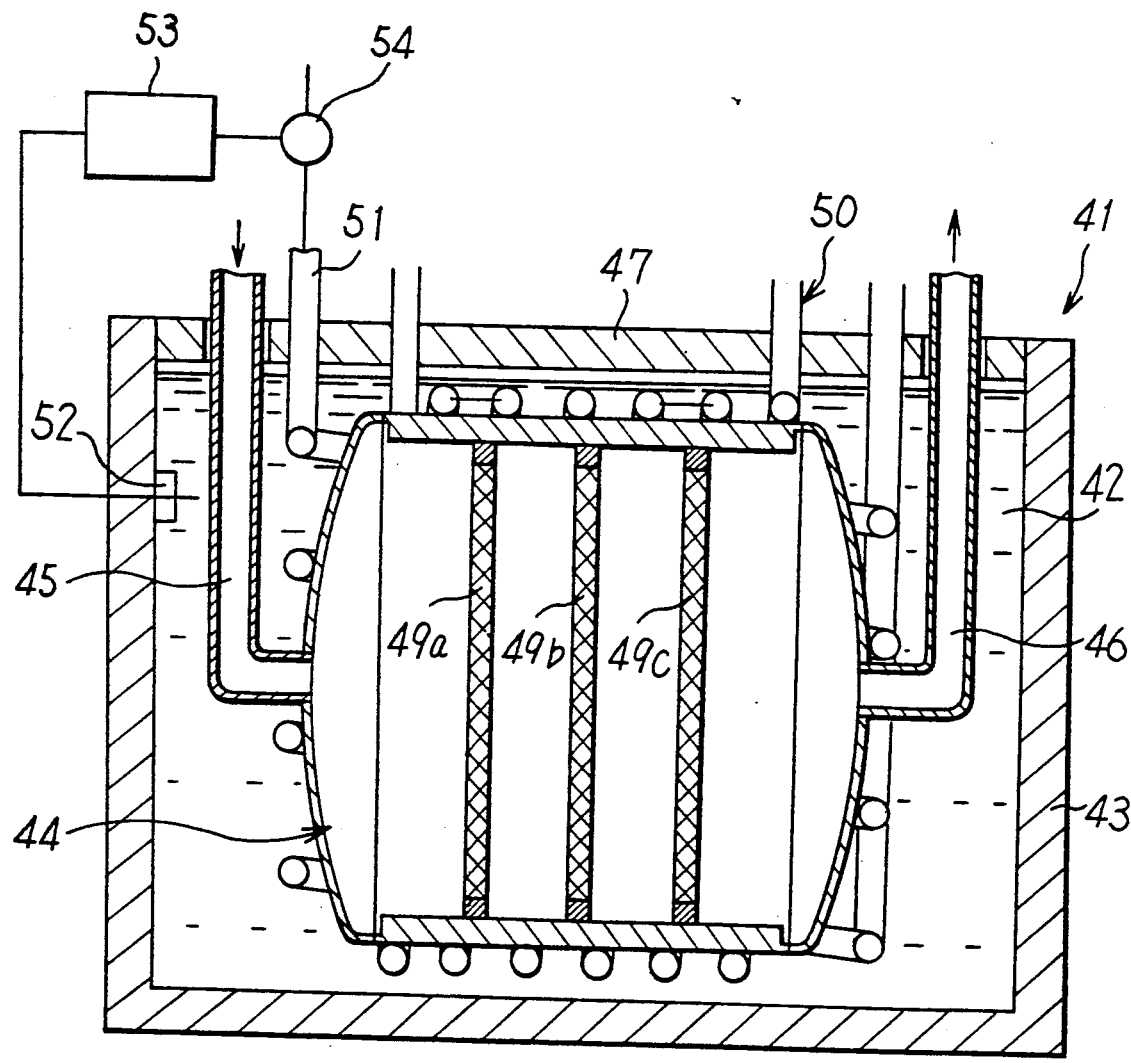
FIG. 3 is a cross-sectional front view of a third preferred embodiment of this invention.

FIG. 3 shows a third preferred embodiment of this invention. A gas cleaner 41 comprises a pipe 51 to supply a primary coolant leading into a heat-insulating coolant container 43 filled with a secondary coolant 42. A hermetically sealed container 44 to which a pipe 45 to supply a gas to be cleaned and a pipe 46 to discharge a cleaned gas are connected is immersed in the secondary coolant 42 in the coolant container 43. The pipe 51, supply pipe 45 and discharge pipe 46 extend outside the cleaner 41 through the holes provided in a heat-insulating cover 47 of the coolant container 43. A temperature sensor 52 is installed in the coolant container 43, which is connected to a controller 53 that controls the supply of the primary coolant from a supply unit 54 to the pipe 51 according to the output of the temperature sensor 52.

While liquid nitrogen may be used as the primary coolant, the secondary coolant is chosen from among coolants having higher freezing point, such as ethanol. The secondary coolant is cooled by the primary coolant to a temperature slightly lower than the freezing point thereof.

The hermetically sealed container 44 is made of a thermally conductive material as in the first preferred embodiment. Filters 49a, 49b and 49c disposed substantially at right angles to the direction of the gas flow are closely fitted to the inner wall of the container 44 to keep a high thermal conductivity. The filters are made, as in the first preferred embodiment, by sintering fine particles, fibers or composites thereof of a thermally conductive metal, such as stainless steel and brass. The filters are formed to have such meshes as are close to the mean free path of the gas to be cleaned. It is preferable to make the pores in the successive filters progressively finer from the coarser one 49a on the inlet side toward the finer one 49c on the outlet side. It is particularly preferable for the filter on the inlet side, which adsorbs a large quantity of moisture, to have coarser pores. The hermetically sealed container 44 contains a heater 50 that heats the atmosphere under a high vacuum before cleaning starts, thereby sufficiently releasing the moisture within the container.

The primary coolant supplied from the primary coolant supply unit 54 to the pipe 51 cools the secondary coolant 42 filled in the coolant container 43 and then the hermetically sealed container 44 therethrough. The temperature in the hermetically sealed container 44 drops from the periphery thereof to the center of the filters 49a, 49b and 49c. Made of a material having a good thermal conductivity, the filters 49a, 49b and 49c cool rapidly, thus permitting gas cleaning to be started in a shorter time.

When the temperature sensor 52 senses that the secondary coolant 42 has been cooled to a temperature slightly below the freezing point thereof, the primary coolant supply unit stops the supply of the primary coolant and a gas to be cleaned flows in through the supply pipe 45. The gas passes through the filters to the discharge pipe 46. During this travel, the secondary coolant 42 liquefies and adsorbs gases (vapors) of impurities that evaporate at higher temperatures than the secondary coolant 42. After the gases of impurities, moisture and dust have been removed by the filters 49a, 49b and 49c, a cleaned gas flows outside through the discharge pipe 46.

Though heated by the supplied gas, the secondary coolant 42 cooled to a temperature slightly below the freezing point thereof can maintain a constant temperature for a relatively long time because of the latent heat of melting. This permits increasing the intervals at which the secondary coolant 42 is cooled by the primary coolant and, therefore, facilitates the temperature control thereof.

In all of the preferred embodiments described herein, the coolant is released into the atmosphere. But the coolant may also be collected and liquefied in a container for recirculation.

What is claimed is:

1. A gas cleaner comprising a heat-insulating coolant container to be filled with a coolant and a hermetically sealed container of a thermally conductive material immersed in the coolant in said coolant container, the hermetically sealed container having a pipe to supply a gas to be cleaned, a pipe to discharge a cleaned gas, and filters of sintered metal to remove moisture from the cooled gas flowing through the container from the supply pipe to the discharge pipe by means of liquefaction and adsorption, and the filters being made of a sintered metal prepared by sintering fine particles or fibers of a thermally conductive metal and closely and directly fitted to the inner wall of the hermetically sealed container.

2. A gas cleaner comprising a heat-insulating coolant container to be filled with a coolant, a case to pass a temperature control fluid, and a hermetically sealed container of a thermally conductive material provided in both of said coolant container and case, the hermetically sealed container having a pipe to supply a gas to be cleaned, a pipe to discharge a cleaned gas, and filters of sintered metal to remove moisture from the cooled gas flowing through the container from the supply pipe to the discharge pipe by means of liquefaction and adsorption, the gas inlet side and the gas outlet side of the hermetically sealed container being respectively placed in said case and coolant container, the filter on the gas inlet side being positioned in the case side of the hermetically sealed container and the other filters in the coolant container side thereof, and the filters being made of a sintered metal prepared by sintering fine particles or fiber of a thermally conductive metal and closely and directly fitted to the inner wall of the hermetically sealed container.

3. A gas cleaner comprising a pipe to supply a primary coolant, a heat-insulating coolant container filled with a secondary coolant that is cooled by said primary coolant to a temperature near the freezing point of the secondary coolant, and a hermetically sealed container of a thermally conductive material immersed in the coolant in said coolant container, the hermetically sealed container having a pipe to supply a gas to be cleaned, a pipe to discharge a cleaned gas, and filters of sintered metal to remove moisture from the cooled gas flowing through the container from the supply pipe to the discharge pipe by means of liquefaction and adsorption, and the filters being made of a sintered metal prepared by sintering fine particles or fibers of a thermally conductive metal and closely and directly fitted to the inner wall of the hermetically sealed container.

4. A gas cleaner according to any one of claims 1 to 3 in which the hermetically sealed container is made of stainless steel.

5. A gas cleaner according to any one of claims 1 to 3 in which the hermetically sealed container is made of an aluminum alloy.

6. A gas cleaner according to any one of claims 1 to 3 in which the filters are made by sintering fine particles, fibers or composites thereof of stainless steel.

7. A gas cleaner according to any one of claims 1 to 3 in which the pores in the successive filters are made progressively finer from the gas inlet side to the gas outlet side.

8. A gas cleaner according to any one of claims 1 to 3 in which a heater is provided in the hermetically sealed container.

9. A gas cleaner according to claim 2 in which a temperature control unit that heats the gas inlet side of the hermetically sealed container by forcibly passing air from the inlet to the outlet of the case to prevent the liquefaction of gases within the hermetically sealed container.

10. A gas cleaner according to claim 3 in which a temperature sensor is provided in the coolant container and connected to a controller that controls the supply of the primary coolant to the primary coolant supply pipe according to the output of the temperature sensor.

* * * * *